United States Patent
Raikar et al.

(10) Patent No.: US 10,017,202 B2
(45) Date of Patent: Jul. 10, 2018

(54) STEERING WHEEL ADAPTIVE MASS DAMPENING SYSTEM

(71) Applicant: GM GLOBAL TECHNOLOGY OPERATIONS LLC, Detroit, MI (US)

(72) Inventors: Sadanand N. Raikar, Sterling Heights, MI (US); Mukesh Amin, Canton, MI (US); Jeffrey J. Schultz, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 15/132,527

(22) Filed: Apr. 19, 2016

(65) Prior Publication Data
US 2017/0297604 A1    Oct. 19, 2017

(51) Int. Cl.
*B62D 1/10*    (2006.01)

(52) U.S. Cl.
CPC ...................... *B62D 1/10* (2013.01)

(58) Field of Classification Search
CPC ................... B62D 1/11; B62D 1/10
See application file for complete search history.

(56) References Cited

U.S. PATENT DOCUMENTS

| 4,390,193 A | * | 6/1983 | Strahan | B62D 1/11 |
| | | | | 280/750 |
| 5,295,710 A | * | 3/1994 | Kido | B62D 1/11 |
| | | | | 280/750 |

FOREIGN PATENT DOCUMENTS

JP    06001196 A  *  1/1994  ............... B62D 1/11

\* cited by examiner

*Primary Examiner* — Thomas C Diaz
(74) *Attorney, Agent, or Firm* — Quinn IP Law

(57) ABSTRACT

A steering wheel and column assembly for a vehicle includes a steering column housing and a steering column shaft rotatably coupled to the steering column housing. A steering wheel includes a central hub coupled to the steering column shaft and a steering wheel rim connected to the central hub by one or more spokes extending radially from the central hub. A dampening system cooperates with the steering wheel and includes at least one mass damper body disposed adjacent to central hub. One or more vibration damping elements extend at least partially through the at least one mass damper body and the central hub. One or more resilient support members cooperate with the at least one mass damper body, central hub and the one or more vibration damping elements to absorb vibrations in the steering wheel and column assembly.

20 Claims, 3 Drawing Sheets

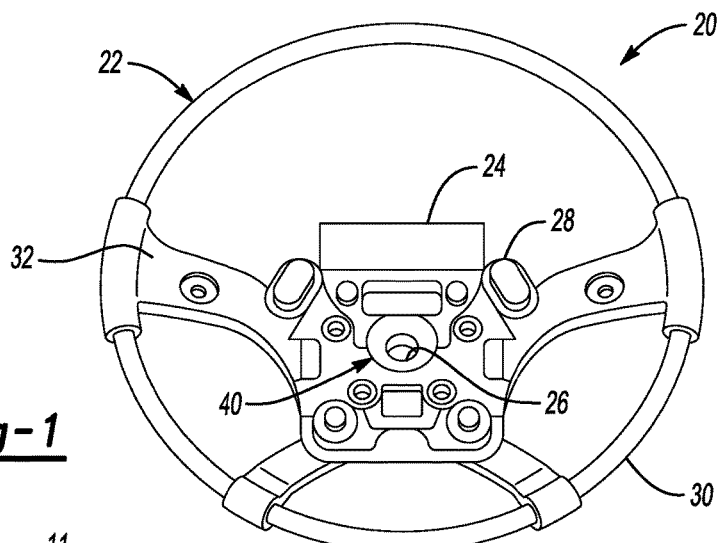
*Fig-1*
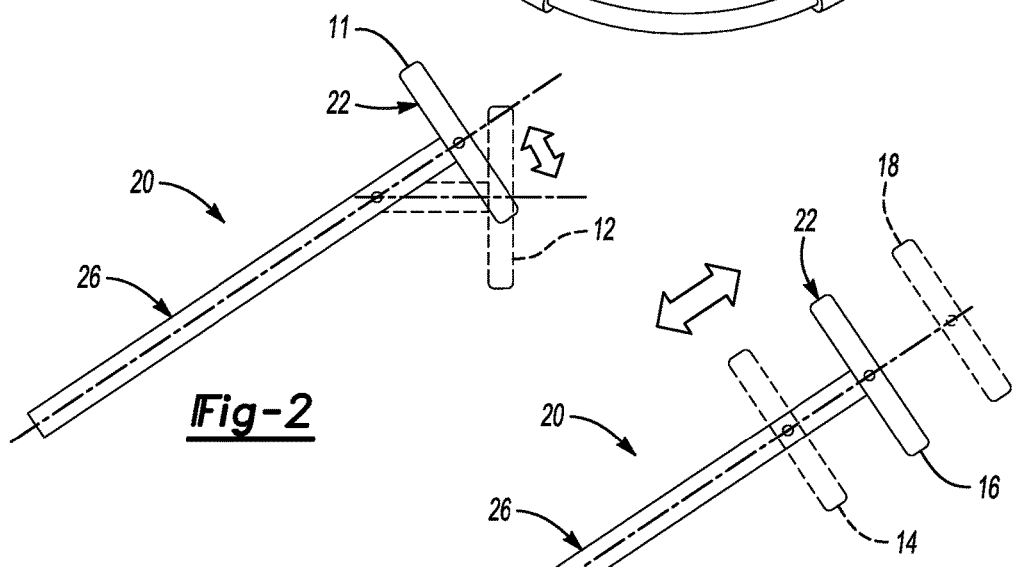
*Fig-2*
*Fig-3*
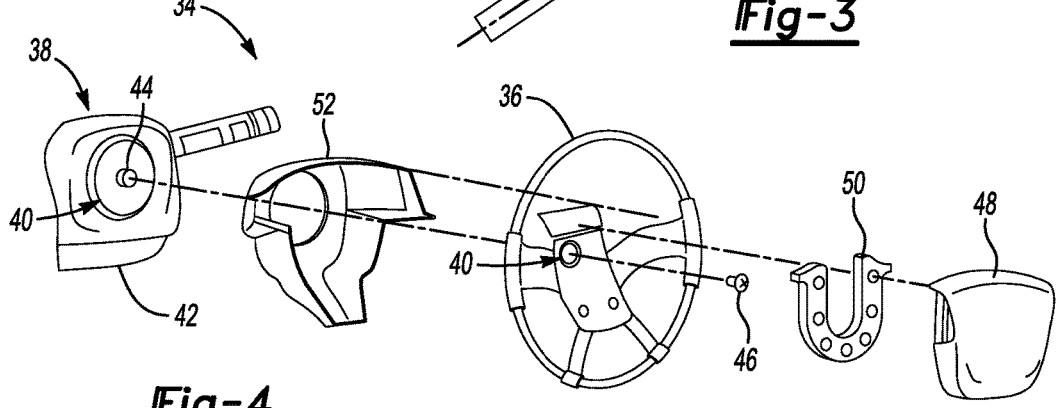
*Fig-4*

STEERING WHEEL ADAPTIVE MASS DAMPENING SYSTEM

TECHNICAL FIELD

The present disclosure pertains to vehicular steering systems and, more particularly, to a steering wheel and column assembly including a dampening system.

BACKGROUND

Vehicle steering wheel and column assemblies have been extensively engineered to provide desirable steering characteristics. Conventional steering wheel and column assemblies may still permit minor torsional vibrations to be transmitted through the steering column shaft to the steering wheel. Such vibrations may be produced by various periodic sources at the rotating corners of the vehicle, such as the tires, wheels, brake rotors, bearing hub assemblies and the like, in response to such conditions as imbalance and non-uniform tires. The vibrations may be produced even when the vehicle is traveling over a relatively smooth road.

This vibratory condition may be characterized by the unwanted dynamic rotational movement of the steering wheel at or above thresholds perceptible to a driver. Although this rotational movement is relatively minor, it is readily perceptible to a driver and consequently undesirable. A mass damper may be incorporated in a steering wheel to dampen the vibration by either adding a mass on the steering wheel armature or using the driver airbag or the inflator itself as the mass dampening device. However, a mass damper may be limited by design to anticipate a range of frequencies.

Traditional steering wheel mass dampeners are tuned to dampen one frequency of vibration in a single position that may be referred to as a mid-mid position of the steering column. The frequency of vibrations may change if the steering column is adjusted away from the mid-mid position, such as when a telescopic or tilt feature on the steering wheel is adjusted, which may increase vibrations as the steering wheel and column is extended towards the driver.

SUMMARY

A steering wheel and column assembly for a vehicle includes a steering column housing and a steering column shaft rotatably coupled to the steering column housing. A steering wheel includes a central hub coupled to the steering column shaft and a steering wheel rim connected to the central hub by one or more spokes extending radially from the central hub.

A dampening system cooperates with the steering wheel and includes at least one mass damper body disposed adjacent to the central hub. One or more vibration damping elements extend at least partially through the at least one mass damper body and central hub. One or more resilient support members extend at least partially around an outer periphery of the one or more vibration damping elements and cooperate with the one or more vibration damping elements to absorb vibrations in the steering wheel and column assembly.

In one embodiment of the disclosure, the one or more resilient support members are disposed between the at least one mass damper body and the central hub of the steering wheel to absorb vibrations in the steering wheel and column assembly. The one or more vibration damping elements and one or more resilient support members may be formed of an elastomeric material. The one or more resilient support members may include a body having a channel formed at least partially through an inner periphery to receive the one or more vibration damping elements.

A plurality of apertures are formed in the at least one mass damper body and central hub and aligned with the channel in the one or more resilient support members to receive and support the one or more vibration damping elements. The at least one mass damper body further comprises a unitary body formed to cooperate with and be disposed adjacent to the central hub of the steering wheel. A supplemental inflatable restraint (SIR) module may be mounted on the steering wheel.

In another embodiment of the disclosure, a steering wheel and column assembly for a vehicle includes a steering column housing and a steering column shaft rotatably coupled to the steering column housing. A steering wheel including a central hub coupled to the steering column shaft and a steering wheel rim connected to the central hub by one or more spokes extending radially from the central hub cooperates with a dampening system.

The dampening system includes at least one mass damper body disposed adjacent to central hub having a plurality of apertures configured for alignment with corresponding apertures in the central hub. One or more vibration damping elements extend at least partially through and are disposed within the apertures in the at least one mass damper body and the central hub. One or more resilient support members include a body having an inner periphery with a channel formed at least partially therethrough that extends at least partially around an outer periphery of the one or more vibration damping elements. The one or more resilient support members cooperate with the one or more vibration damping elements to absorb vibrations in the steering wheel and column assembly.

The one or more resilient support members are disposed between the at least one mass damper body and the central hub of the steering wheel to absorb vibrations in the steering wheel and column assembly. The one or more vibration damping elements and one or more resilient support members may be formed of an elastomeric material, such as rubber or the like. The at least one mass damper body further comprises a unitary body formed to cooperate with and be disposed adjacent to the central hub of the steering wheel. A supplemental inflatable restraint (SIR) module may be mounted on the steering wheel.

In yet another embodiment of the disclosure, a dampening system for use with a steering wheel including a central hub and a steering wheel rim connected to the central hub by one or more spokes extending radially from the central hub includes at least one mass damper body disposed adjacent to central hub. One or more vibration damping elements extend at least partially through and connect the at least one mass damper body with the central hub. The one or more resilient support members extend at least partially around an outer periphery of the one or more vibration damping elements and cooperate with the one or more vibration damping elements to absorb vibrations in the steering wheel.

The one or more resilient support members may include a body having a channel formed at least partially through an inner periphery to receive the outer periphery of the one or more vibration damping elements. The one or more vibration elements extend through a plurality of apertures in the at least one mass damper body and a corresponding plurality of apertures in the central hub to be received in the channel in the one or more resilient support members.

The one or more vibration damping elements and one or more resilient support members may be formed of an elastomeric material, such as rubber or the like. The at least one mass damper body further comprises a unitary body formed to cooperate with and be disposed adjacent to the central hub of the steering wheel.

The above noted and other features and advantages of the present disclosure are readily apparent from the following detailed description when taken in connection with the accompanying drawings.

BRIEF DESCRIPTION OF THE DRAWINGS

FIG. 1 is a perspective view of a dampening system incorporated in a steering wheel assembly in accordance with the present disclosure;

FIG. 2 is a side view of the steering wheel and column assembly shown in a variety of column tilt positions;

FIG. 3 is a side view of the steering wheel and column assembly shown in a variety of telescopic steering wheel and column positions;

FIG. 4 is an exploded perspective view of a steering wheel and column assembly;

DETAILED DESCRIPTION

Figure 5:
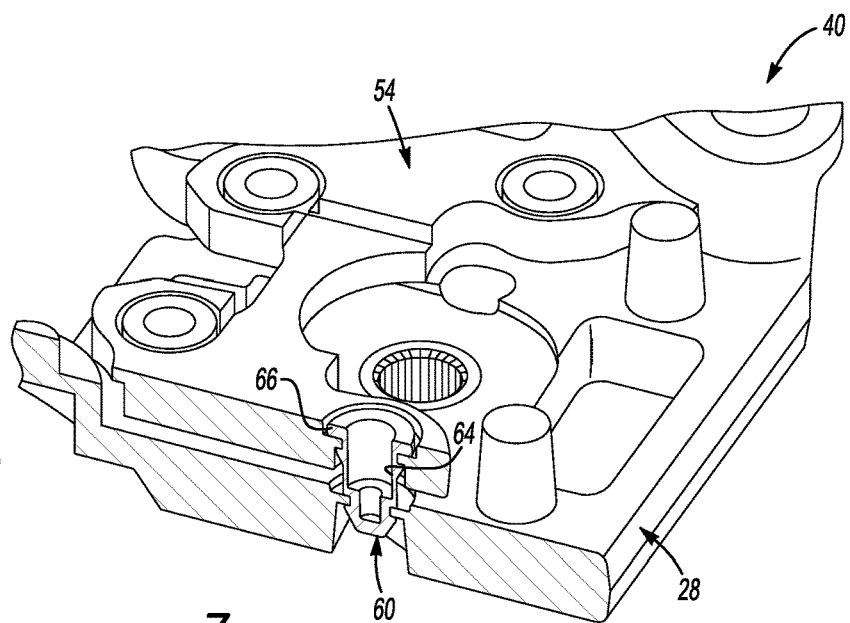
FIG. 5 is a perspective view of a section of the dampening system positioned on the central hub of the steering wheel.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring now to the drawings, wherein like reference numbers correspond to like or similar components throughout the several figures, FIG. 1 illustrates a steering wheel and column assembly 20 for a vehicle. The vehicle may include a motorized vehicle, such as, but not limited to, standard passenger cars, sport utility vehicles, light trucks, heavy duty vehicles, minivans, buses, transit vehicles, bicycles, robots, farm implements, sports-related equipment or any other transportation device.

Steering wheel and column assembly 20 includes a steering wheel 22, a steering column housing 24, and a steering column shaft 26. Steering column housing 24 is fixedly mounted to a base mounting structure provided on a host vehicle (not shown). Steering wheel 22 includes a steering wheel rim 30 that is connected to a central hub 28 by a plurality of radial spokes 32. Central hub 28 is fixedly coupled to the upper end of steering column shaft 26, which is, in turn, rotatably mounted within steering column housing 24.

During the occurrence dynamic motions at the threshold of driver detection, imbalances internal to the vehicle produce vibrations that are transmitted through steering column shaft 26, through central hub 28, through spokes 32, and to steering wheel rim 30. These vibrations may result in the rotational or axial movement of steering wheel rim 30.

As is shown in FIGS. 2 and 3, steering wheel and column assembly 20 may be adjustable to a variety of positions using a telescopic or tilt feature on the steering wheel and column. FIG. 2 illustrates steering wheel and column assembly 20 adjustable between at least a first position referenced by numeral 11 and a second position 12, wherein the steering column tilts the steering wheel relative to the first position 11. FIG. 3 illustrates steering wheel and column assembly 20 that allows steering wheel 22 to be telescopically adjustable between a min-min position, referenced by numeral 14, a mid-mid position, referenced by numeral 16 and a max-max position, referenced by numeral 18.

FIG. 4 is an exploded view of a portion of a steering wheel and column assembly 34 in accordance with a first exemplary embodiment of the disclosure. Steering wheel and column assembly 34 is similar to assembly 20 described above in conjunction with FIG. 1. For example, steering wheel and column assembly 34 comprises a steering wheel 36 and a steering column 38 partially shown in FIG. 4. Steering column 38 includes a stationary steering column housing 42 and a steering column shaft 44, which is rotatably mounted within steering column housing 42.

Steering wheel 36 may be affixed to the exposed end of steering column shaft 44 utilizing, for example, splined interconnecting features and a locking bolt 46 or other such fastener. Steering wheel and column assembly 34 further includes a supplemental inflatable restraint (SIR) or airbag module 48 and a horn contact 50, which are each deployed on steering wheel 36. In one embodiment of the disclosure, SIR module 48 may be mounted to the central hub 28 of steering wheel 36 over horn contact 50.

A lower cover 52 may also be mounted between steering column 38 and steering wheel 36 as shown in FIG. 2. When steering wheel 36 is turned by a driver, both steering wheel 36 and steering column shaft 44 rotate relative to steering column housing 42. For this reason, steering wheel 36 and steering column shaft 44 may be collectively referred to as a "rotatable steering assembly" herein.

Referring now to FIGS. 1 and 5-7, a dampening system 40 for integration with and use in a steering wheel and column assembly for a vehicle is described in greater detail. Dampening system 40 may include at least one mass damper body 54 disposed adjacent the central hub 28 of the steering wheel 22. The at least one mass damper body 54 may be weighted within a predetermined range to reduce vibrations of the vehicle through the steering wheel 22. In one embodiment of the disclosure, the at least one mass damper body 54 is formed as a unitary body to be disposed adjacent and mounted to the central hub 28 of the steering wheel 22. It is understood that the at least one mass damper body 54 may be formed of one or more sections that may be assembled or placed on the central hub 28 of the steering wheel 22.

Apertures 56 may be provided in and extend through the at least one mass damper body 54. Apertures 56 may be configured to align with corresponding apertures 58 formed in the central hub 28 of steering wheel 22 to cooperate to receive one or more vibration damping elements 60. The one or more vibration damping elements 60 extend at least partially through the apertures 56 in the at least one mass damper body 54 and apertures 58 in the central hub 28 of the steering wheel 22.

Figure 6:
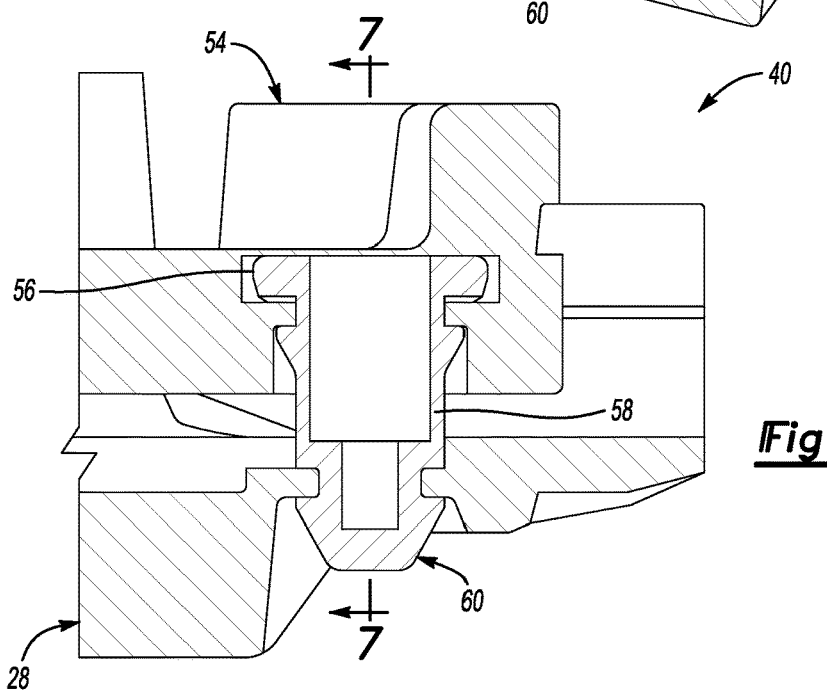
FIG. 6 is a cross-sectional view of the dampening system.
Figure 7:
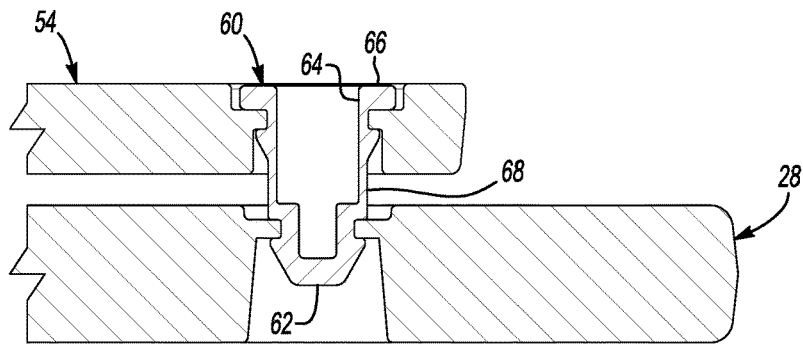
FIG. 7 is a cross-sectional view of the dampening system along line 7-7 in FIG. 6.

As is best shown in FIGS. 6 and 7, the one or more vibration damping element 60 includes a body 62 defining an inner periphery 64 therein and a corresponding outer periphery 68. As illustrated additionally in FIG. 7, body 62 may include one or more ribs or projections 66 formed on an outer periphery 68 of body 62 that are sized to cooperate and engage surfaces of the at least one damper body 54 and central hub 28. The at least one vibration damping element 60 may be formed of an elastomeric material and cooperate with the central hub 28 and at least one damper body 54 to reduce vibrations in the steering wheel and column assembly.

Figure 8:
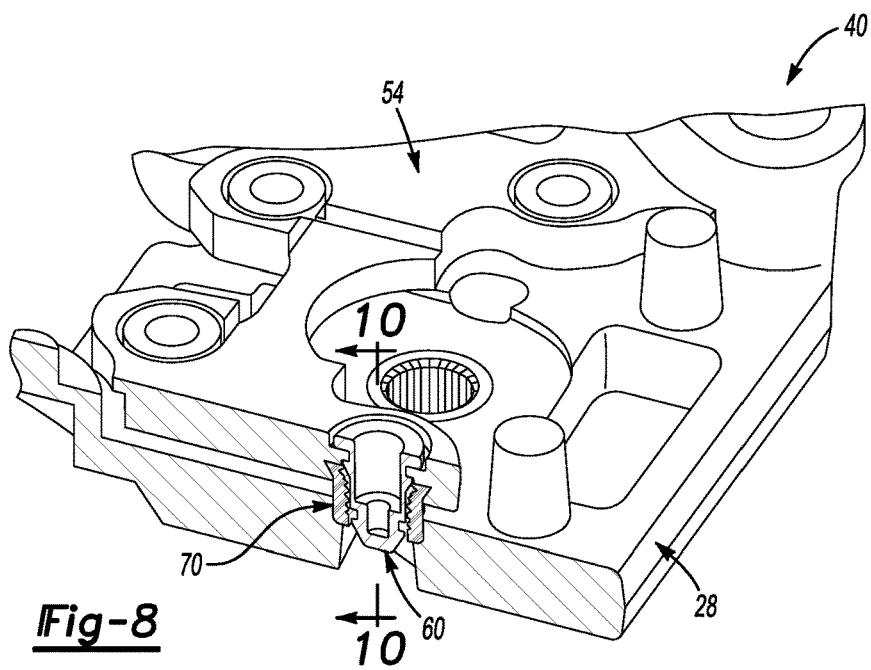
FIG. 8 is a perspective view of the dampening system positioned on the central hub of the steering wheel.
Figure 9:
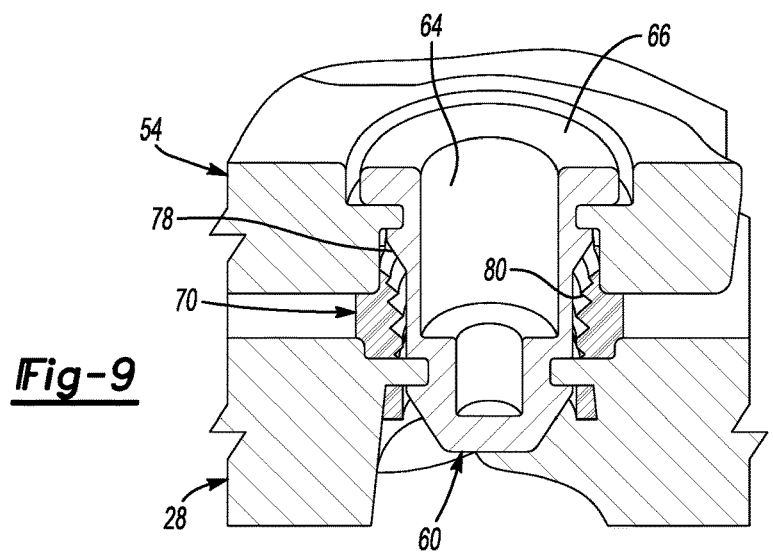
FIG. 9 is a perspective view of the dampening system in accordance with the disclosure.
Figure 10:
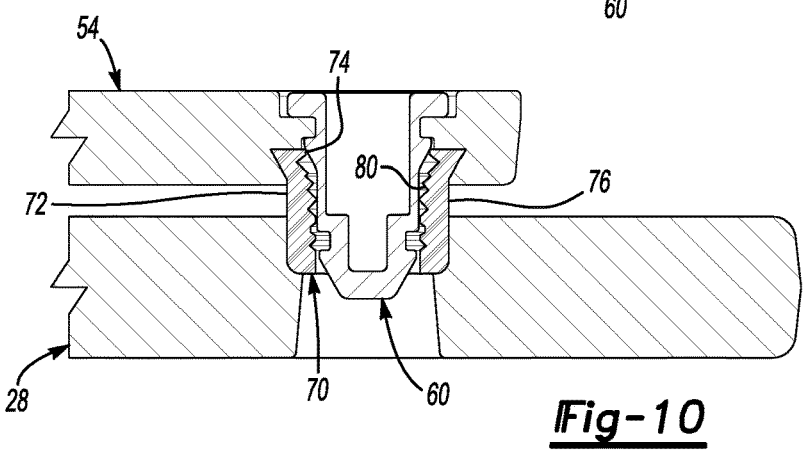
FIG. 10 is a cross-sectional view of the dampening system along line 10-10 in FIG. 8.

Referring now to FIGS. 8-10, the dampening system for use with a steering wheel and column assembly of a vehicle may further include one or more resilient support members 70. Resilient support members 70 may include a body 72 defining an inner periphery 74 and an outer periphery 76. A channel 78 may be formed at least partially through an inner periphery 74 of the one or more resilient support members 70 and configured to receive a portion of the one or more vibration damping elements 60.

In one embodiment of the disclosure, the one or more resilient support members 70 extend at least partially around the outer periphery 68 of the one or more vibration damping elements 60 and cooperate with the one or more vibration damping elements 60 to absorb vibrations in the steering wheel and column assembly 34. In another embodiment of the disclosure, the one or more resilient support members 70 may be formed of an elastomeric material, including, but not limited to rubber.

One or more resilient support members 70 may be disposed between the at least one mass damper body 54 and the central hub 28 of the steering wheel to absorb vibrations in the steering wheel and column assembly. It is contemplated, as shown in FIGS. 8-10, that channel 78 of the one or more resilient support member 70 cooperates with apertures 56 in the at least one mass damper body 54, projections 66 on the outer periphery 68 of the body 62 of the one or more vibration damping elements 60 and apertures 58 in the central hub 28 of the steering wheel 22 to receive and engage a portion of the at least one vibration damping elements 60.

The one or more vibrations elements 60 may extend through apertures 56, 58 into channel 78 of the one or more resilient support members 70. The channel 78 in the inner periphery 74 of the body 72 of resilient support members 70 may include receiving surfaces 80 configured to releasably engage the outer periphery 68 of the one or more vibration damping elements 60.

In one embodiment of the disclosure, dampening system 40 can be activated to increase stiffness to improve the performance of the steering wheel and column assembly in response to noise, vibration and harshness (NVH) conditions which may include the noise level in the vehicle during operation, the vibration that can be felt by the driver during operation of the vehicle and the harshness of the vehicle ride during abrupt transitions in vehicle motion. It is contemplated that the one or more resilient support members 70 may rotate about the one or more vibration damping elements 60 in an axis parallel to the steering column assembly axis to reduce vibrations.

Use of the one or more resilient support members 70 in combination with the one or more vibration damping elements 60 allows for reduction of vibrations without a change in the mass or geometry of the at least one mass damper body 54 as may be required in traditional steering systems. The one or more resilient members 70 coupled to the one or more vibration damping elements 60 may increase the stiffness of the one or more vibration elements whenever the steering wheel and column assembly receives higher vibrations based upon the position of the steering wheel and column assembly. This arrangement of the one or more resilient support members 70 and one or more vibration damping elements 60 allows for tuning of the materials to reduce a single vibration frequency on the steering wheel and column assembly even when positioned in the max-max or min-min positions.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A steering wheel and column assembly for a vehicle comprising:
   a steering column housing;
   a steering column shaft rotatably coupled to the steering column housing;
   a steering wheel including a central hub coupled to the steering column shaft, wherein the central hub includes one or more apertures formed therein, and a steering wheel rim connected to the central hub by one or more spokes extending radially from the central hub; and
   a dampening system for use with the steering wheel, the dampening system including:
      at least one mass damper body disposed adjacent and mounted to the central hub, the at least one mass damper body including one or more apertures formed therein and aligned with the one or more apertures on the central hub when the at least one mass damper body is mounted to the central hub,
      one or more vibration damping elements including a body extending at least partially through and engaging surfaces of the one or more apertures in the at least one mass damper body and the one or more apertures in the central hub, and
      one or more resilient support members including a body having an outer periphery and an inner periphery with a channel formed at least partially through the inner periphery to receive and engage a portion of the one or more vibration damping elements,
      wherein the one or more vibration damping elements at least partially engage the surfaces of the one or more apertures in the at least one mass damper body, the one or more apertures in the central hub and the channel in the one or more resilient support members to absorb vibrations in the steering wheel and column assembly.

2. The steering wheel and column assembly of claim 1 wherein the one or more resilient support members is disposed between and engages the one or more apertures of the at least one mass damper body and the central hub of the steering wheel.

3. The steering wheel and column assembly of claim 1 wherein the one or more vibration damping elements are formed of an elastomeric material.

4. The steering wheel and column assembly of claim 1 wherein the one or more resilient support members are formed of an elastomeric material.

5. The steering wheel and column assembly of claim 1 wherein the at least one mass damper body further comprises a unitary body disposed adjacent and mounted to the central hub of the steering wheel.

6. The steering wheel and column assembly of claim 1 further comprising a supplemental inflatable restraint (SIR) module mounted on the steering wheel.

7. The steering wheel and column assembly of claim 1 wherein the body of the one or more vibration damping elements further comprises an inner periphery and an outer periphery having one or more projections formed thereon that engage the surfaces of the apertures in the at least one mass damper body and the central hub of the steering wheel to position the one or more vibration damping elements in the at least one mass damper body and the central hub.

8. The steering wheel and column assembly of claim 7 wherein the body of the one or more resilient support members further comprise receiving surfaces formed on the inner periphery of the body releasably engaging the outer periphery of the one or more vibration damping elements.

9. A steering wheel and column assembly for a vehicle comprising:
  a steering column housing;
  a steering column shaft rotatably coupled to the steering column housing;
  a steering wheel including a central hub coupled to the steering column shaft, wherein the central hub includes one or more apertures formed therein, and a steering wheel rim connected to the central hub by one or more spokes extending radially from the central hub; and
  a dampening system for use with the steering wheel, the dampening system including:
    at least one mass damper body disposed adjacent and mounted to the central hub, the at least one mass damper body including one or more apertures formed therein and aligned with the one or more apertures on the central hub when the at least one mass damper body is mounted to the central hub,
    one or more vibration damping elements including a body extending at least partially through and engaging surfaces in the one or more apertures in the at least one mass damper body and the one or more apertures in the central hub, wherein the body of the one or more vibration damping elements includes an inner periphery and an outer periphery having one or more projections formed thereon that engage the surfaces of the apertures in the at least one mass damper body and the central hub of the steering wheel to position the one or more vibration damping elements in the at least one mass damper body and the central hub, and
    one or more resilient support members including a body having an outer periphery and an inner periphery with a channel formed at least partially through the inner periphery to receive and engage a portion of the one or more vibration damping elements, wherein the inner periphery of the one or more resilient support members aligns with the one or more apertures in the at least one mass damper body and central hub and includes receiving surfaces releasably engaging the outer periphery of the one or more vibration damping elements,
    wherein the one or more vibration damping elements at least partially engage the surfaces of the one or more apertures in the at least one mass damper body, the one or more apertures in the central hub and the channel in the one or more resilient support members to absorb vibrations in the steering wheel and column assembly.

10. The steering wheel and column assembly of claim 9 wherein the one or more resilient support members is disposed between and engages the one or more apertures of the at least one mass damper body and the central hub of the steering wheel.

11. The steering wheel and column assembly of claim 9 wherein the one or more vibration damping elements are formed of an elastomeric material.

12. The steering wheel and column assembly of claim 9 wherein the one or more resilient support members are formed of an elastomeric material.

13. The steering wheel and column assembly of claim 12 wherein the one or more resilient support members are formed of rubber.

14. The steering wheel and column assembly of claim 9 wherein the at least one mass damper body further comprises a unitary body formed to cooperate with and be disposed adjacent to the central hub of the steering wheel.

15. The steering wheel and column assembly of claim 9 further comprising a supplemental inflatable restraint (SIR) module mounted on the steering wheel.

16. A dampening system for use with a steering wheel including a central hub and a steering wheel rim connected to the central hub by one or more spokes extending radially from the central hub, the dampening system comprising:
  at least one mass damper body disposed adjacent and mounted to the central hub, the at least one mass damper body including one or more apertures formed therein, wherein the one or more apertures align with one or more apertures in the central hub when the at least one mass damper body is mounted to the central hub;
  one or more vibration damping elements including a body extending at least partially through and engaging surfaces of the one or more apertures in the at least one mass damper body and the one or more apertures in the central hub; and
  one or more resilient support members disposed between the at least one mass damper body and central hub, wherein the one or more resilient support members includes a body having an outer periphery and an inner periphery with a channel formed at least partially through the inner periphery to receive and engage a portion of the one or more vibration damping elements,
  wherein the one or more vibration damping elements at least partially engage the surfaces of the one or more apertures in the at least one mass damper body, the one or more apertures in the central hub and the channel in the one or more resilient support members to absorb vibrations in the steering wheel.

17. The dampening system of claim 16 wherein the one or more vibration damping elements are formed of an elastomeric material.

18. The dampening system of claim 16 wherein the at least one mass damper body further comprises a unitary body formed to cooperate with and be disposed adjacent to the central hub of the steering wheel.

19. The dampening system of claim 16 wherein the body of the one or more vibration damping elements further comprises an inner periphery and an outer periphery having one or more projections formed thereon that engage the surfaces of the apertures in the at least one mass damper body and the central hub of the steering wheel to position the one or more vibration damping elements in the at least one mass damper body and the central hub.

20. The dampening system of claim 19 wherein the body of the one or more resilient support members further comprise receiving surfaces formed on the inner periphery of the body releasably engaging the outer periphery of the one or more vibration damping elements.

* * * * *